(12) United States Patent
Yu et al.

(10) Patent No.: US 6,192,241 B1
(45) Date of Patent: Feb. 20, 2001

(54) WORLDWIDE WIRELESS SUBSCRIBER ACCESS SERVICE

(75) Inventors: I-Hsiang Yu, Lexington, MA (US); Jeffrey L. Crollick, Temple Terrace, FL (US)

(73) Assignees: Verizon Laboratories Inc., Waltham, MA (US); GTE Telecommunications Services Incorporated, Tampa, FL (US)

( * ) Notice: Under 35 U.S.C. 154(b), the term of this patent shall be extended for 0 days.

(21) Appl. No.: 08/926,494

(22) Filed: Sep. 10, 1997

(51) Int. Cl.[7] .................................................. H04Q 7/38
(52) U.S. Cl. ...................... 455/433; 455/432; 455/435; 455/445
(58) Field of Search ........................... 455/432, 445, 455/435, 459, 433, 16, 426; 379/59, 60, 210, 211, 212, 88.16, 157

(56) References Cited

U.S. PATENT DOCUMENTS

| | | | |
|---|---|---|---|
| 4,696,028 | * | 9/1987 | Morganstein et al. .................... 385/4 |
| 4,833,701 | * | 5/1989 | Comroe et al. ......................... 379/60 |
| 4,850,012 | * | 7/1989 | Mehta et al. .......................... 379/157 |
| 5,095,529 | * | 3/1992 | Comroe et al. ......................... 455/16 |
| 5,307,400 | * | 4/1994 | Sawyer .................................. 379/59 |
| 5,610,973 | * | 3/1997 | Comer .................................. 379/59 |
| 5,703,930 | * | 12/1997 | Miska et al. .......................... 455/426 |
| 5,825,869 | * | 10/1998 | Brooks et al. ........................ 379/265 |
| 5,832,382 | * | 11/1998 | Alperovich ........................... 455/433 |
| 5,884,179 | * | 3/1999 | Patel .................................... 455/445 |

OTHER PUBLICATIONS

Roland Mahler & Dr.C.J.Waylan, "Finally–Roaming Relief for the Global Traveller" Sep./Oct. 1995, *Cellular & Mobile International*, 5 pgs.

GTE Service Corporation Press Release, Oct. 4, 1995, re GlobalRoam (SM), 7 pgs.

GTE Personal Communications Service Press Release re GlobalRoam (SM), 5 pgs.

GTE/DeTeMobil Product Brochure "GlobalRoam Brings You the World", 10 pgs.

* cited by examiner

Primary Examiner—Dwayne D. Bost
Assistant Examiner—Joy K. Redmon
(74) Attorney, Agent, or Firm—Leonard Charles Suchyta

(57) ABSTRACT

Wireless telephone communications are processed by first contacting a worldwide wireless access facility which interfaces between the caller and the phone systems to determine a present location of a subscriber. The facility queries the home system requesting a roaming status and number of the subscriber. If the subscriber is roaming, the home network identifies a present serving network for the indicated subscriber from a list maintained of each subscriber's roaming location. The home network queries the present serving system and obtains a temporary local directory number for the subscriber. The home network returns a number to the worldwide wireless facility for reaching the subscriber. The facility uses this number to direct the telephone call to the called party.

14 Claims, 6 Drawing Sheets

WORLDWIDE WIRELESS SUBSCRIBER ACCESS SERVICE

BACKGROUND OF THE INVENTION

1. Field of the Invention

This invention generally relates to wireless communication systems, and more particularly to a wireless telephonic system that determines the location of a subscriber in order to allow direct communication with the subscriber without a preliminary call to the home system.

2. Description of the Related Art

Some wireless telephone systems, including cellular systems operating in the United States, use a "Roamer Access Port" function to allow subscribers to receive incoming calls while roaming. Roaming refers to when a subscriber is in a geographical area not served by a subscriber's home network. According to this function, the subscriber notifies potential callers that he will be roaming and when they want to reach the roaming subscriber they call a "Roamer Access Port" number of a network operating in the current location of the roaming subscriber, i.e., a serving network. They can obtain this number from the subscriber or look it up in a directory. In practice, the caller first dials the "Roamer Access Port" number of the serving network. After receiving a network prompt (e.g., an announcement or a tone), the caller enters a unique Mobile Directory Number (MDN) for the subscriber and waits for the call to be connected. After receiving the MDN, a network controller performs a network-wide or area-wide page for that particular MDN. If the subscriber's phone is powered-on and tuned to one of the paging channels of this network, it will respond with a page response. The controller then assigns a voice/traffic channel for the roaming subscriber's mobile phone and instructs the mobile phone to tune to the assigned voice/traffic channel. The network controller then instructs the mobile phone to alert the subscriber of the incoming call and provides an audible ringing tone to the caller at the same time. When the subscriber answers the call, the controller cuts through the call path and the caller and the subscriber can begin the conversation.

Currently, there are two cellular networks operating in any given city. The cellular subscriber must notify potential callers which network he plans to use for roaming. If the caller does not have this information, he may dial the "Roamer Access Port" number of a network other than the one to which the subscriber's mobile phone is tuned. If the caller knows that there are two networks in a given market, he may look up the "Roamer Access Port" number of the other network and try again. Otherwise, the caller may think that the cellular subscriber has turned off the mobile station or has left that city after receiving the response from the network that the indicated MDN cannot be reached.

One disadvantage of using a Roamer Access Port is that the subscriber must notify callers of his roaming location as well as the time he plans to stay there and the network he will be in. In addition, the callers must obtain the appropriate "Roamer Access Port" number of the network in the cellular subscriber's roaming location.

Other current cellular systems keep track of a subscriber's location by using manual registration/de-registration or automatic registration/de-registration of the mobile phone. Through a manual or automatic registration process the subscriber's home network maintains information on the network currently serving a particular roaming subscriber. Using this type of scheme, callers can reach the subscriber whether he is in his home network or roaming in a serving network.

However, these manual or automatic registration/de-registration systems have several disadvantages. For example, if the subscriber and his home network are based in Massachusetts, then when the caller places the call, it is directed to Massachusetts and the caller must pay for the call from his location to Massachusetts. If the subscriber is not in Massachusetts, but rather is roaming in California, then the home system initiates an additional call to forward the incoming call from Massachusetts to California. The called party must now pay for the phone call from Massachusetts to California.

The extra telephone charges and connections are especially inefficient when the called party is actually located in a zone close to the caller. For example, when the caller is in California, the system first forwards the call to the home network in Massachusetts before routing the call to the called party in California and calling a Massachusetts based party who is currently roaming in California.

Therefore, it is desirable to have a system that does not require a subscriber to inform others in advance where he plans to be roaming or of a roamer access number for a network in that location. It is also desirable to have a system that does not require a call to a subscriber's home system to determine the location of the called party.

The present invention uses and expands on current cellular network systems such as Ames, or GTE's GSM GlobalRoam System which provides an interface between varying worldwide telecommunication standards and forwards received telephone calls to cellular serving sites worldwide. Basic cellular services such as those discussed above will not be elaborated on in this description.

SUMMARY OF THE INVENTION

Systems and methods consistent with the present invention include a system and a method for processing telephone calls. A call is sent from a caller to an access service facility. The called party is identified by information received from the caller. The called party's home network is determined and queried to find out a present status of the called party. If the called party is not roaming and is currently being serviced by the home network, then the home network returns either a temporary number or a previously assigned telephone number (MDN) to a service controller associated with the facility. If the called party is roaming, the home network queries the serving network for the called party for a temporary number following the existing standard protocol. The home network then forwards the received number to the service controller. The service controller instructs a switch associated with facility to route call.

BRIEF DESCRIPTION OF THE DRAWINGS

The accompanying drawings, which are incorporated in and constitute part of this specification illustrating embodiments of the invention and, together with the descriptions they explain the advantages and principles of the invention. In the drawings.

DETAILED DESCRIPTION

Reference will now be made in detail to the construction and operation of preferred implementations of the present invention which are illustrated in the accompanying drawings. The following description of the preferred implementations of the present invention is only exemplary of the invention. The present invention is not limited to these implementations, but may be realized by other implementations.

Systems consistent with the present invention provide a worldwide subscriber access service that allows a caller to dial a nationwide or worldwide unique number to reach a subscriber. After the call is routed to an access service facility, the caller is asked to provide a public or private directory number, terminal identification, or some other information, such as name or address of the subscriber. The caller is then connected to that subscriber wherever he is currently located. The subscriber can be, for example, a cellular or mobile satellite subscriber in the United States or outside the United States. The worldwide subscriber access service may be deployed in any country.

Figure 1:
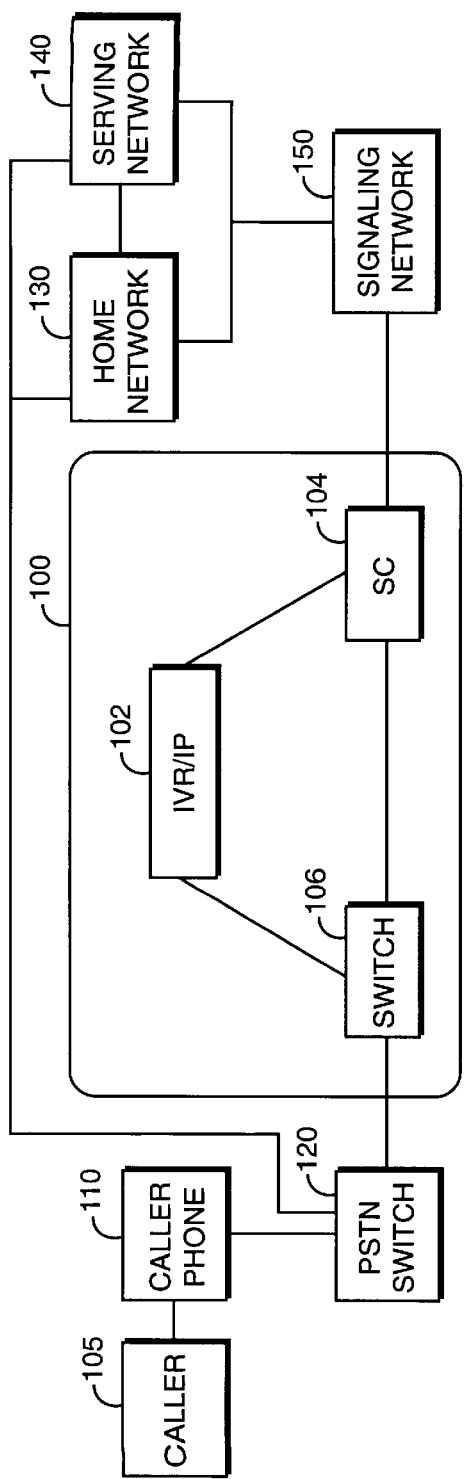
FIGS. 1, 2 and 5 are block diagrams of architectures for a system for worldwide wireless subscriber service according to the present invention.

FIG. 1 is a block diagram of an architecture of a worldwide subscriber access facility 100 and is used to explain how it connects and communicates with a public telephone network through public switched telephone network (PSTN) switch 120 and other networks 130 and 140, which may be cellular or other wireless networks. A caller 105 at caller phone 110 places a call through switch 120 to the facility 100. Switch 106 informs a Service Controller (SC) 104 about incoming calls. SC 104 processes the call, instructs an Interactive Voice Response Unit/Intelligent Peripheral (IVR/IP) 102 to play an announcement and collect information from the caller 105, controls the switch 106 for call routing and processing, and communicates with other nodes in the public telephone network and other networks. SC 104 communicates with the home network 130 for a called subscriber and the home network 130 communicate with the serving network 140 for the roaming subscriber, via a Signaling Network 150, which may be, for example, a Signaling System No. 7 (SS7) or via X.25 or some combination of these two.

Switch 106 can be connected to the public telephone network through switch 120 with, for example, Multi-Frequency (MF), SS7 Integrated Services Digital Network User Part (ISUP) or Primary Rate Interface (PRI) trunks, or Basic Rate Interface (BRI) which supports both trunks (or bearer channels) and signaling. The interface between SC 104 and the IVR/IP 102 can be proprietary or standard interfaces such as TCP/IP or SS7. Switch 106 and IVR/IP 102 may be connected by, for example, PRI, MF, or NNSS7 trunks or a direction signaling link. The interface between SC 104 and switch 106 may be, for example, a proprietary or standard signaling interface (e.g., INET or wireless intelligent network WIN, TCP/IP, SS7, or X.25), INAP, or wireless network (WN) or a PRI interface. If SS7 interface is used between SC and the switch, the switch and SC may be connected via a STP or STP pair(s), or via a direct SS7 link.

SC 104 includes processing architecture with a processor, memory, and service logic for performing procedures such as those shown in FIGS. 3–4 and 6–7.

Figure 2:
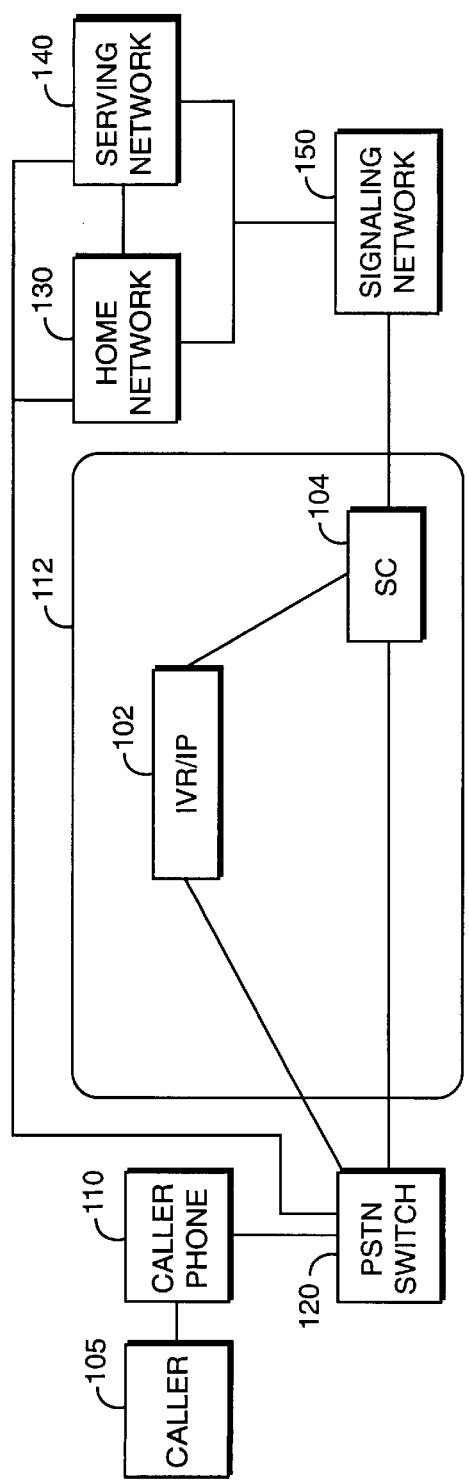

FIG. 2 is a block diagram of another architecture for a worldwide subscriber's access facility 112 according to the present invention. Unlike facility 100 of FIG. 1, however, worldwide subscriber access facility 112 does not include switch 106. Rather, the functions performed by switch 120 are performed by a switch in the public switched telephone network. In this arrangement, SC 104 controls switch 120 and IVR/IP 102.

In one alternative embodiment to both FIGS. 1 and 2, the SC 104 controls IVR/IP 102 through switch 120 instead of directly. In this case, there is no direct physical interface between SC 104 and IVR/IP 102 shown in FIGS. 1 and 2.

In another alternate embodiment to both FIGS. 1 and 2, the IVR/IP 102 may be located outside of the worldwide wireless access service 100.

Figure 3:
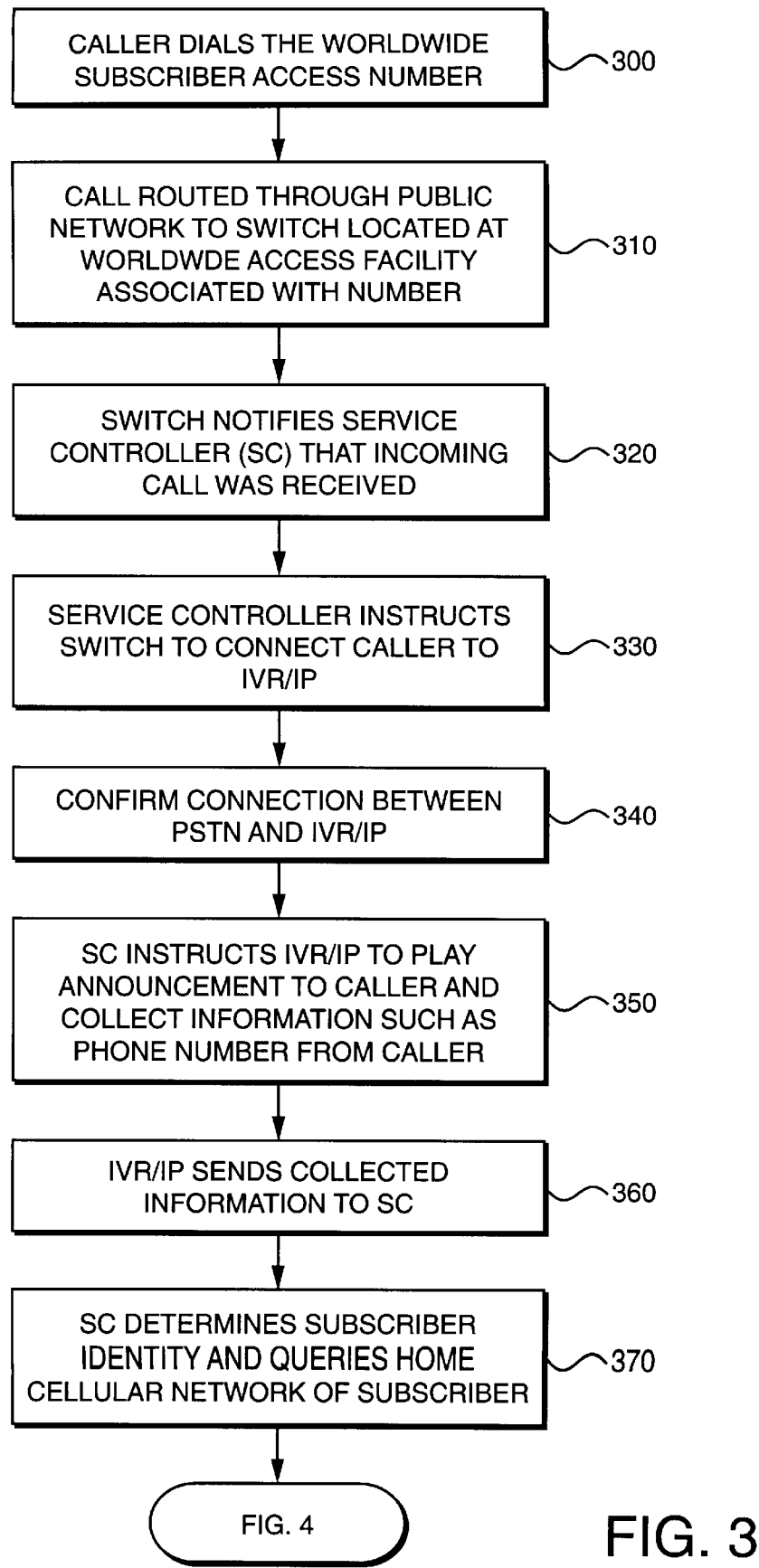
FIG. 3 is a flow chart of the steps for initiating calls according to the present invention as shown in FIGS. 1 and 2.
Figure 4:
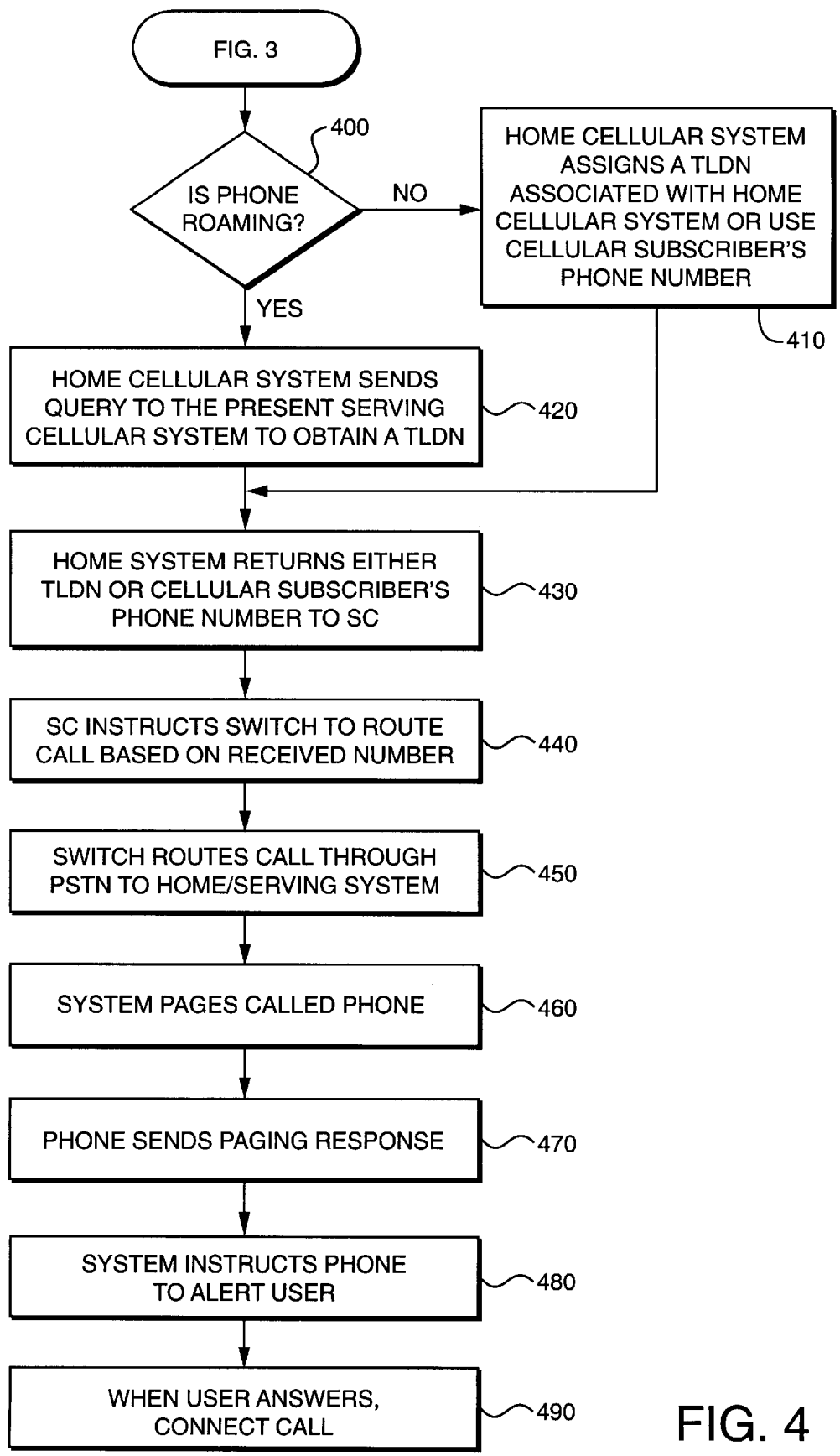
FIG. 4 is a flow chart of the steps for processing calls according to the present invention as shown in FIGS. 1 and 2.

FIGS. 3–4 show the steps for connecting calls using facility 100 and 112 of FIGS. 1 and 2, respectively. The only distinction between the two systems is that the steps performed by switch 106 of facility 100 are performed for facility 112 by a switch in public switched network 120.

FIG. 3 is a flow chart that shows the steps for initiating a telephone call between a caller and a called party, i.e., a subscriber to the worldwide access service according to the present invention. First, the caller dials a number to reach worldwide access service facility 100 (step 300). The call is routed through switch 120 to switch 106 located at worldwide access service facility 100 associated with the dialed access service facility number (step 310). Switch 106 notifies service controller 104 that an incoming call was received (step 320). Service controller 104 instructs switch 106 to connect the caller to IVR/IP 102 (step 330). Once service controller 104 confirms that there is a connection between public switched telephone network and IVR/IP 102 (step 340), service controller 104 instructs IVR/IP 102 to play an announcement to the caller 105 at caller phone 110 to collect information on the subscriber from the caller 105 (step 350). The information may include a phone number, a subscriber's name, or other identifying information about the subscriber. The caller may also elect to talk to a live operator for yellow pages type of service, and provide the name and address of the subscriber to find out the phone number.

IVR/IP 102 then sends the collected information to service controller 104 (step 360). Service controller 104 determines the subscriber's identity and queries home network 130 of the called subscriber (step 370) asking home network 130 for a routing number to reach the identified subscriber through signaling network 150. Home network 130 maintains a list including information on the roaming status and location of each subscriber using a manual or automatic registration/de-registration system described herein. For example, when a subscriber leaves his home network 130 and enters a serving network 140, he registers with the serving network, and the serving network updates the subscriber's home network with information indicating that the subscriber can be reached in the serving network. Home network 130 has a processor to perform procedures for determining a current roaming status and a present serving network 140 of a subscriber by referring to the list. Home network 130 may assign a Temporary Local Directory Number (TLDN) to a subscriber or route an incoming call to a subscriber using his regular MDN telephone number if the subscriber is not roaming. Home network 130 may also query serving network 140 to obtain a TLDN for a roaming subscriber. Home network 130 can provide these telephone numbers to worldwide wireless access facility 100 via signaling network 150.

Call processing continues with the steps shown in FIG. 4. Home network 130 determines whether the phone of the identified subscriber is roaming by referring to the stored registration information (step 400). If the subscriber is not roaming, home network 130 selects either a TLDN or the subscriber's assigned number MDN (step 410). If the subscriber is roaming, home network 130 sends a query to the serving network 140 requesting a TLDN number and receives the TLDN number from the serving network 140 (step 420). Home network 130 then returns either the TLDN or the subscriber's phone number to SC 104 via signaling network 150 (step 430). In one embodiment, the home network 150 may also return a call forwarding number in the subscriber's service profile when the caller has a call forwarding service and any conditions of that service are met. For example, call forwarding may only occur when a phone is busy, or when the feature is activated. If a caller has call forwarding and does not wish to have calls forwarded at this time then the caller is informed of the called party's unavailability. The call forwarding features are not further discussed as the present invention does not alter already existing call forwarding services. This temporary local directory number is temporarily assigned to the subscriber and is not his permanent number. Serving network 140 keeps a list of subscribers and assigned TLDNs, for a period of time before releasing the TLDNs for new incoming calls.

Service controller 104 instructs switch 106 to route the call based on the received number (step 440). Switch 106 routes the call through PSTN 120 to the appropriate home network 130 or serving network 140 for reaching the subscriber (step 450). The returned telephone number identifies home network 130 as the appropriate network when the party is not roaming and shows network 140 as the appropriate network when the party is roaming. PSTN 120 routes the call to the appropriate network. The network that receives the call pages the subscriber's phone to confirm that it is on (step 460). The phone returns a paging response (step 470) and the system instructs the phone to alert the party of the call (step 480). When the subscriber answers the call, the call is connected (step 490).

Figure 5:
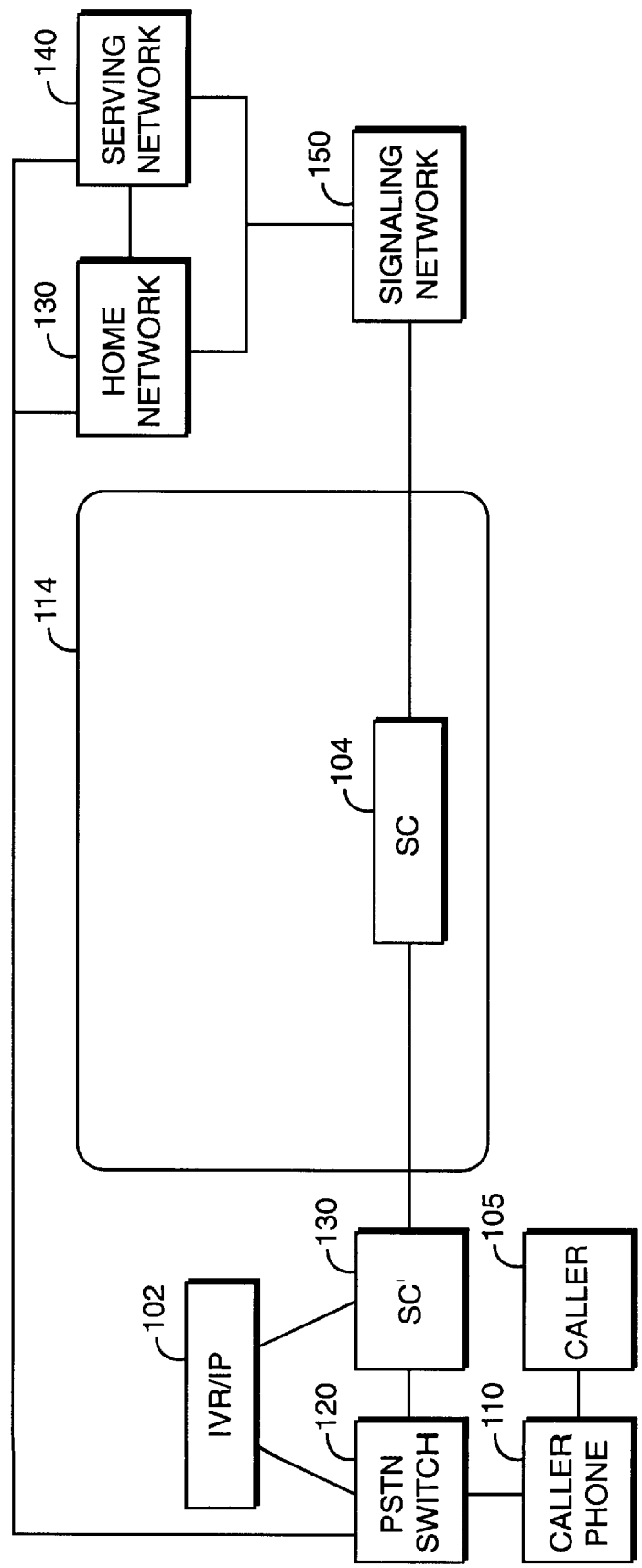

FIG. 5 is a block diagram of another architecture for a worldwide subscriber facility 114 according to the present invention. Unlike facility 112 of FIG. 2, however, IVR/IP 102 is located external to facility 114. Switch 106, IVR/IP 102 and some SC functions (called SC') 160 are supported by the public switched telephone network or alternatively by a private network. The SC' functions include instructing the IVR/IP 102 to request and obtain certain information from a caller on caller phone 110.

Figure 6:
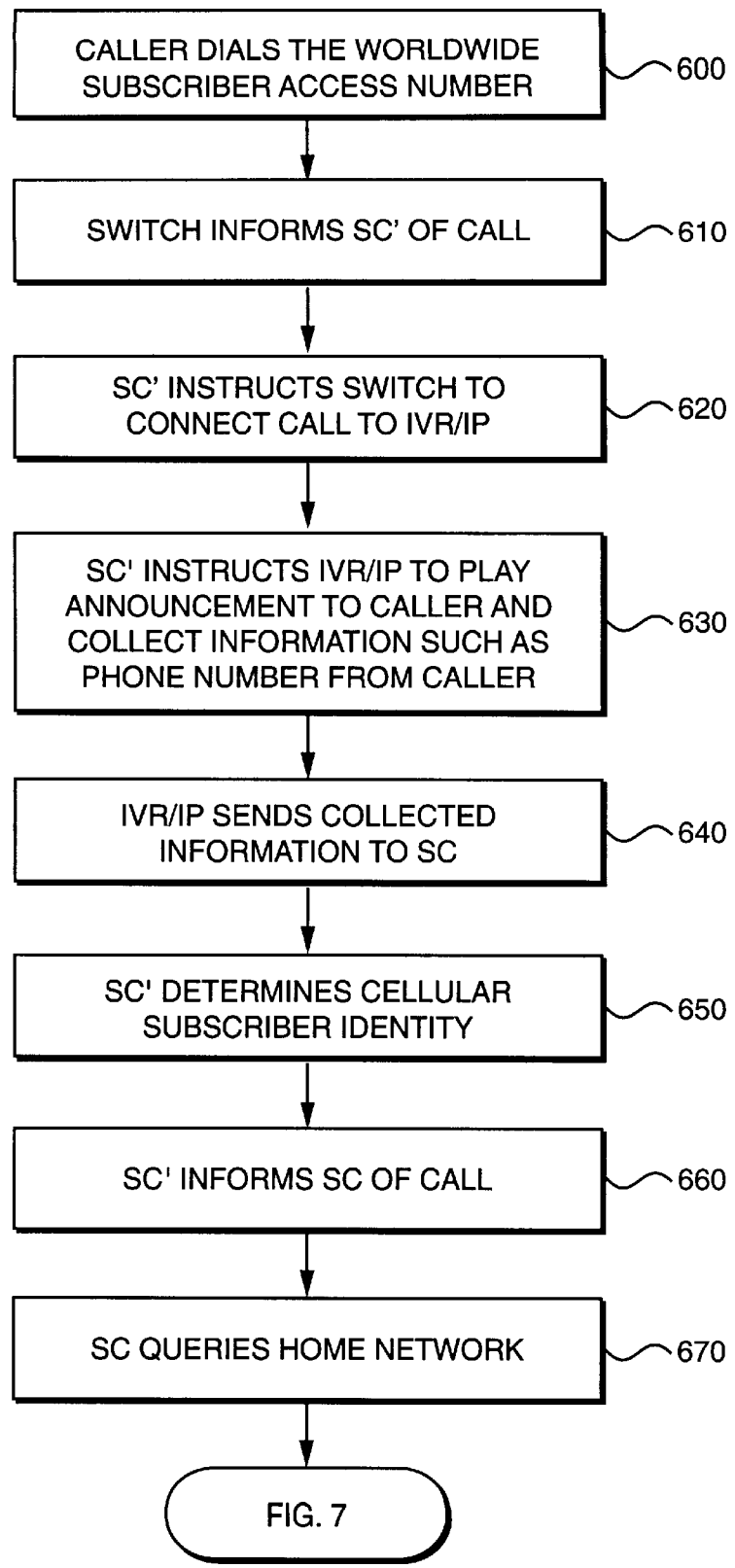
FIG. 6 is a flow chart of the steps for initiating calls according to the present invention as shown in FIG. 5.
Figure 7:
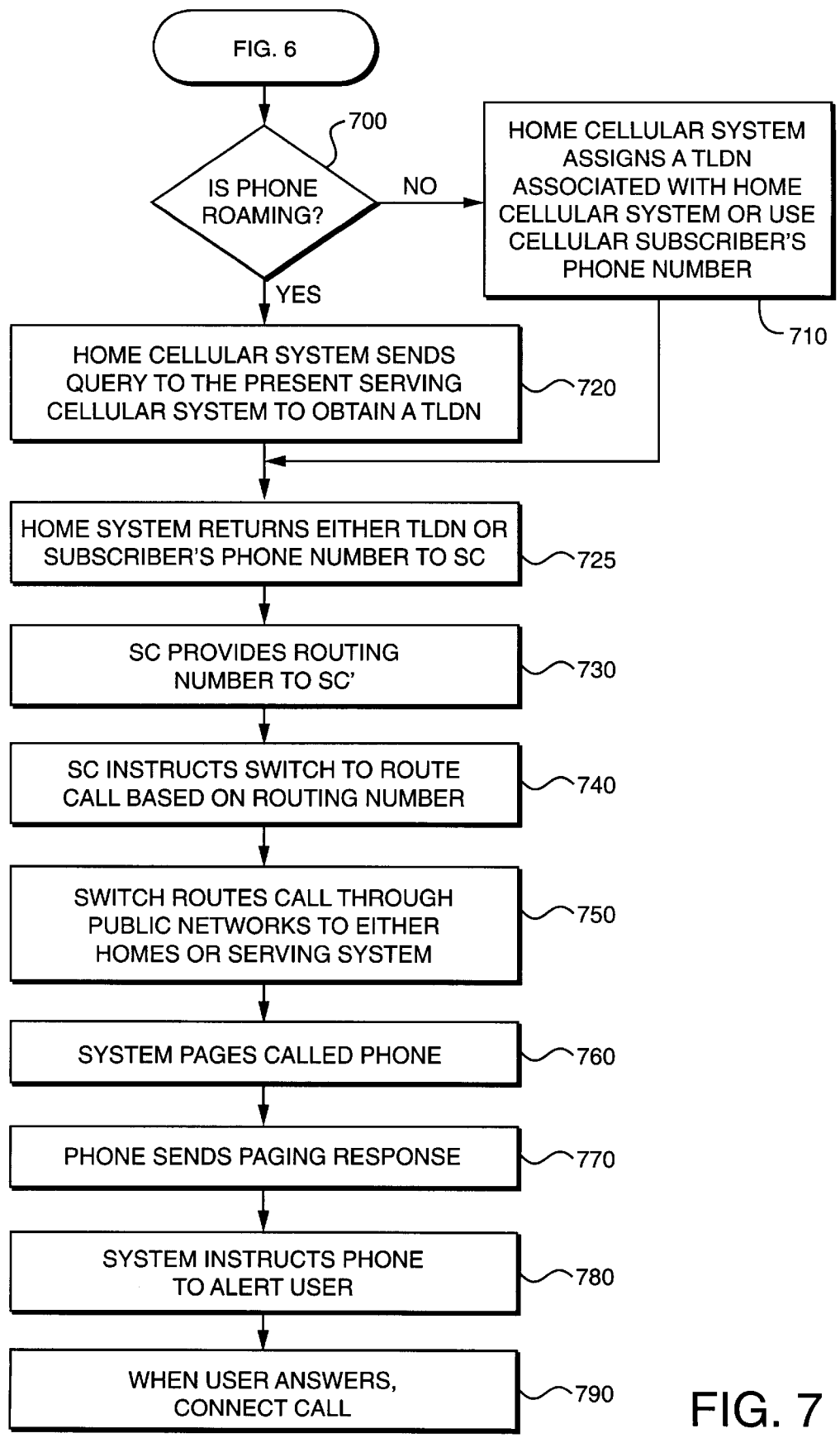
FIG. 7 is a flow chart of the steps for processing calls according to the present invention as shown in FIG. 5.

FIGS. 6–7 show the steps for processing a phone call using the system shown in FIG. 5. The caller dials a number to access the worldwide wireless subscriber access facility 114 (step 600). The call first reaches a switch at the public telephone network 120. The switch gives an indication to SC' 160 of the incoming call (step 610). SC' 160 instructs the switch to connect the caller to the IVR/IP 102 (step 620). When the connection between the switch and IVR/IP 102 is confirmed, SC' 160 instructs the IVR/IP 102 to play an announcement and collect information (e.g., phone number or terminal identification) about the called subscriber (step 630). In a preferred embodiment, the caller can select the option to talk to a live operator for mobile yellow pages type of service (e.g., give a name or address), and the subscriber's identity will be retrieved automatically and made available to SC' 160. IVR/IP 102 sends SC' 160 the identifying information (step 640) which in turn determines the subscriber's identity (step 650). SC' 160 informs SC 104 about the incoming call (step 660). Step 650 may alternatively be performed by SC 104, eliminating step 660.

SC 104 launches a query to the home call network 130 of the intended subscriber (step 670). Home network 130 determines whether the subscriber is roaming (step 700). If the phone is roaming outside the home network, the home network will send a query to the serving cellular system for a Temporary Local Directory Number (TLDN) associated with the serving system (step 720). Home network 130 returns either the TLDN or the subscriber's phone number (step 725). If the phone is not roaming, the home network may assign a TLDN associated with the home network or may just use the subscriber's phone number (step 710). As previously described, in one embodiment, the home network 130 returns a forwarding number from the subscriber's profile when the subscriber has a call forwarding service. SC 104 provides the routing information, either the TLDN or subscriber's phone number, to SC' 160 (step 730). SC' 160 instructs the switch 120 to route the call based on the received number (step 740). The switch routes the call through the PSTN and the call arrives at either the home network or a serving network (step 750). The home or serving network then pages the called subscriber's phone (step 760). The phone sends a paging response (step 770) and the system instructs the phone to alert the user of call (step 780). When the subscriber answers, the network then connects the call (step 790).

CONCLUSION

The present invention allows for a wireless telephone communication to be directly connected to a current serving network of the called party by using a worldwide wireless facility to obtain a number of the called party and route the call to a current serving network. The present invention does not require subscribers to tell people where they plan to travel or to pay for excessive forwarding phone charges.

Persons of ordinary skill in the art will recognize that various modifications and variations can be made in the network and methods of the present invention without departing from the scope or spirit of the invention.

Other embodiments of the invention will be apparent to those skilled in the art from consideration of the specification and practice of the invention. The specification and examples are only exemplary. The true scope and spirit of the invention is indicated by the following claims.

What is claimed is:

1. A system for processing calls from callers to called parties, comprising:

means for receiving a call from a caller via a local switch;

means for collecting data identifying a called party from the caller;

means for determining a home network of the called party based on the collected data;

means for querying the home network to retrieve routing instructions for the called party; and means for instructing the local switch to send the call to the called party using the routing instructions from the home network.

2. The system according to claim 1, wherein the means for collecting includes:

means for playing an announcement to the caller.

3. The system according to claim 1, wherein the home network includes:

means for maintaining a list identifying subscribers and associated networks;

means for comparing the identified called party to the list of subscribers to determine a current serving network for the called party;

means for querying the current serving network to obtain a temporary routing number for the called party; and means for sending the temporary number as the routing instructions to the means for querying the home network.

4. The system according to claim 1 wherein the home network includes:

means for determining whether the called party is roaming;

means for querying a current serving network for the called party when the called party is roaming;

means for obtaining a temporary number for the called party from the current serving network; and means for returning the temporary number as the routing instructions to the means for querying the home network.

5. The system according to claim 1 further including:

means for determining whether the called party is roaming;

means for receiving, from the home network, a temporary number when the called party is roaming and a base number when the called party is not roaming; and means for routing the call to the received number.

6. The system according to claim 5 further including:

means for paging the called party at a current serving network using the temporary number when the called party is roaming;

means for receiving a page response from the current serving network;

means for instructing the current serving network to alert the called party of the call when a paging response is received; and means for connecting the call when the called party answers the call.

7. A method for processing calls from a caller to a called party comprising the steps, performed by a processor, of:

receiving a call from the caller via a local switch;

collecting data identifying the called party from the caller;

determining a home network of the called party based on the collected data;

querying the home network to retrieve routing instructions for the called party; and instructing the local switch to send the call to the called party using the routing instructions from the home network.

8. The method according to claim 7, wherein the collecting step includes the substep of:

playing an announcement to the caller.

9. The method according to claim 7, wherein the step of querying the home network includes the substeps of:

maintaining a list identifying subscribers and associated networks;

comparing the identified called party to the list of subscribers to determine a current serving network for the called party;

querying the current serving network to obtain a temporary routing number for the called party using the temporary routing number as the routing instructions to route the call to the called party.

10. The method according to claim 7, wherein the step of querying the home network includes the substeps of:

determining whether the called party is roaming;

querying a current serving network for the called party when the called party is roaming;

obtaining a temporary number for the called party from the current serving network; and using the temporary number as the routing instructions to route the call to the called party.

11. The method according to claim 7 further including the steps of:

determining whether the called party is roaming;

receiving a temporary number when the called party is roaming and a base number when the called party is not roaming; and routing the call to the received number.

12. The method according to claim 11 further including the steps of:

paging the called party at a current serving network using the temporary number when the called party is roaming;

receiving a page response from the current serving network;

instructing the current serving network to alert the called party of the call when a paging response is received; and connecting the call when the called party answers the call.

13. The method according to claim 7 further including the step of:

routing the call through a public telephone network to the called party using routing instructions.

14. A call routing facility that processes calls intended for possibly roaming called parties, comprising:

an interactive unit that receives a call from a caller and that interacts with the caller to collect information regarding a called party; and a controller that determines a home network for the called party based on the collected information, that queries the home network for routing information for the called party, and that instructs a local switch to route the call to the called party using the routing information.

* * * * *